US009401614B2

(12) United States Patent
Schmidt et al.

(10) Patent No.: US 9,401,614 B2
(45) Date of Patent: Jul. 26, 2016

(54) METHOD FOR CONTROLLING A BATTERY, AND BATTERY FOR CARRYING OUT THE METHOD

(75) Inventors: Ralph Schmidt, Weinstadt (DE); Stefan Butzmann, Beilstein (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 13/979,024

(22) PCT Filed: Nov. 17, 2011

(86) PCT No.: PCT/EP2011/070305

§ 371 (c)(1), (2), (4) Date: Oct. 21, 2013

(87) PCT Pub. No.: WO2012/095207

PCT Pub. Date: Jul. 19, 2012

(65) Prior Publication Data

US 2014/0035361 A1 Feb. 6, 2014

(30) Foreign Application Priority Data

Jan. 12, 2011 (DE) ........................ 10 2011 002 548

(51) Int. Cl.
*H02J 7/00* (2006.01)
*B60L 11/18* (2006.01)
(Continued)

(52) U.S. Cl.
CPC ........... *H02J 7/0063* (2013.01); *B60L 11/1803* (2013.01); *B60L 11/1855* (2013.01);
(Continued)

(58) Field of Classification Search
CPC ..................................................... H02J 7/0063
USPC .......................... 307/9.1, 10.1; 320/116, 118
See application file for complete search history.

(56) References Cited

U.S. PATENT DOCUMENTS 5,440,220 A 8/1995 Sato et al.
5,939,861 A * 8/1999 Joko ........................ B60K 6/28 290/40 R (Continued)

FOREIGN PATENT DOCUMENTS

| | | | |
|---|---|---|---|
| CN | 101005210 | A | 7/2007 |
| EP | 1 289 096 | A2 | 3/2003 |
| EP | 1 993 185 | A2 | 11/2008 |
| JP | 2002-281677 | A | 9/2002 |
| KR | 10-2010-0008325 | A | 3/2011 |

OTHER PUBLICATIONS

International Search Report corresponding to PCT Application No. PCT/EP2011/070305, mailed Feb. 3, 2012 (German and English language document) (5 pages).

*Primary Examiner* — Kenneth B Wells
*Assistant Examiner* — James P Evans
(74) *Attorney, Agent, or Firm* — Maginot, Moore & Beck LLP

(57) ABSTRACT

A method is used for controlling a battery having at least one battery module line with a plurality of battery modules that are connected in series. Each battery module has at least one battery cell, at least one coupling unit, a first connection, and a second connection. Each battery module is configured to assume one of at least two switching states dependent on a control of the coupling unit. The different switching states correspond to different voltage values between the first connection and the second connection of the battery module. The method includes determining a ranking among the battery modules. The method also includes engaging the battery modules in a supply of a desired output voltage of the battery module line using the ranking. The battery modules compare respective battery module operating states among one another and determine the ranking on the basis of the comparison.

12 Claims, 9 Drawing Sheets

(51) Int. Cl.

| | |
|---|---|
| ***H01M 10/44*** | (2006.01) |
| ***H01M 10/48*** | (2006.01) |

(52) U.S. Cl.

CPC ......... *B60L11/1857* (2013.01); *B60L 11/1859* (2013.01); *B60L 11/1864* (2013.01); *B60L 11/1866* (2013.01); *H01M 10/441* (2013.01); *H01M 10/443* (2013.01); *H01M 10/482* (2013.01); *H02J 7/0016* (2013.01); *H02J 7/0021* (2013.01); *B60L 2240/547* (2013.01); *Y02T 10/7005* (2013.01); *Y02T 10/7011* (2013.01); *Y02T 10/7055* (2013.01); *Y02T 10/7061* (2013.01)

(56) References Cited

U.S. PATENT DOCUMENTS

| | | | | |
|---|---|---|---|---|
| 6,344,728 | B1 * | 2/2002 | Kouzu | B60L 3/0046 320/116 |
| 2005/0105226 | A1 | 5/2005 | Bedard et al. | |
| 2008/0079395 | A1 * | 4/2008 | Miyazaki | H02J 7/0026 320/118 |
| 2008/0284375 | A1 * | 11/2008 | Nagaoka | B60L 11/1855 320/116 |
| 2012/0025769 | A1 * | 2/2012 | Kikuchi | B60L 3/0046 320/118 |

* cited by examiner

METHOD FOR CONTROLLING A BATTERY, AND BATTERY FOR CARRYING OUT THE METHOD

This application is a 35 U.S.C. §371 National Stage Application of PCT/EP2011/070305, filed on Nov. 17, 2011, which claims the benefit of priority to Serial No. DE 10 2011 002 548.0, filed on Jan. 12, 2011 in Germany, the disclosures of which are incorporated herein by reference in their entirety.

The present disclosure relates to a method for controlling a battery having at least one battery module string, in which a battery module in the battery module string comprises a coupling unit, and also to a battery in which the method according to the disclosure can be executed.

BACKGROUND

It is becoming apparent that, in future, battery systems will be increasingly used both in stationary applications and in vehicles such as hybrid and electric vehicles. In order to be able to meet the requirements in respect of voltage and available power specified for a respective application, a large number of battery cells are connected in series. Since the current provided by a battery of this kind has to flow through all battery cells and a battery cell can conduct only a limited current, battery cells are often additionally connected in parallel in order to increase the maximum current. This can be done either by providing a plurality of cell windings within a battery cell housing or by externally interconnecting battery cells. However, the problem of compensation currents possibly occurring between the battery cells which are connected in parallel on account of cell capacitances and voltages which are not exactly identical is encountered in this case.

The basic circuit diagram of a conventional electrical drive unit, as used, for example, in electric and hybrid vehicles or else in stationary applications, such as for rotor blade adjustment of wind power installations, is illustrated in FIG. 1. A battery 10 is connected to a DC voltage intermediate circuit which is buffered by an intermediate circuit capacitor 11. A pulse-controlled inverter 12 is connected to the DC voltage intermediate circuit, said pulse-controlled inverter providing sinusoidal currents, of which the phases are offset in relation to one another, by means of in each case two switchable semiconductor valves and two diodes at three taps 14-1, 14-2, 14-3 for operation of an electric drive motor 13. The capacitance of the intermediate circuit capacitor 11 has to be large enough to stabilize the voltage in the DC voltage intermediate circuit for a period of time over which one of the switchable semiconductor valves is on. A high capacitance in the mF range is produced in a practical application, such as an electric vehicle.

One disadvantage of the arrangement illustrated in FIG. 1 is that the weakest battery cell in the battery 10 determines the range, and that the defect in an individual battery cell already leads to failure of the entire vehicle. In addition, the modulation of the high voltages in the pulse-controlled inverter 12 leads to high switching losses and—since insulated gate bipolar transistor (IGBT) switches typically have to be used owing to the high voltages—likewise to high conduction losses.

A further disadvantage is that the same current flows through battery cells or modules contained in the system and therefore said battery cells or modules cannot be actuated individually. Therefore, there is no way to influence various states of individual battery cells.

SUMMARY

Therefore, the disclosure provides a method for controlling a battery. The battery comprises at least one battery module string having a plurality of battery modules which are connected in series. Each of the battery modules which are connected in series comprises at least one battery cell, at least one coupling unit, a first connection and a second connection and is configured to assume one of at least two switching states as a function of actuation of the coupling unit. In this case, various switching states correspond to different voltage values between the first connection and the second connection of the battery module. Therefore, a different voltage value can be tapped off between the first connection and the second connection of the battery module in each of the switching states. The method according to the disclosure comprises the following steps: a ranking of the battery modules with which said battery modules are involved in providing a desired output voltage of the battery module string is determined in a first method step. In the process, the battery modules compare their respective operating states and determine the ranking on the basis of the comparison. An output voltage, which is to be provided, of the battery module string is determined by a controller in a further method step. A message is sent from the controller to at least one of the battery modules in a further method step. A switching state, which is to be assumed, in each of the battery modules is established in a further method step, this being done on the basis of a comparison between the message sent by the controller and the determined ranking. Finally, the established switching state is assumed by each of the battery modules in a further method step.

Data transmission between the battery modules and the controller is minimized on account of the battery modules comparing their respective operating states and the ranking being determined on the basis of the comparison. The computational power used by the controller can be reduced since it is no longer necessary to determine the states of all modules using the controller. The bandwidth of a bus system which is used for this purpose can be selected to be smaller since all battery modules no longer have to communicate the data, which is required to determine the state, to the controller.

The comparison of the operating states between the individual battery modules can be performed in respect of one or else more different battery characteristic variables, for example in respect of the state of charge, the temperature, the aging or the service life.

It may be sufficient for the message to be sent from the controller only to one of the battery modules, it being possible for said battery module to then communicate with the rest of the battery modules in order to allow them to receive information about the switching state which is respectively to be assumed. However, the message is preferably sent by the controller to each of the battery modules.

The message sent by the controller can contain the output voltage, which is to be provided, of the battery module string. It is then possible to establish, on the basis of the output voltage which is to be provided, which switching states have to be assumed by the respective battery modules in order to generate the required output voltage.

Another option is for the message sent by the controller to contain a number of battery modules which are intended to assume a predetermined switching state. This is sufficient, for example, when all battery modules provide an identical module voltage in one of their switching states, so that an output voltage, which is to be provided, of the battery module string is defined by the number of battery modules which assume this switching state.

It is further preferred for each of the battery modules to automatically determine its respective operating state, in particular using a microcontroller which is associated with the battery module or is contained in said battery module. Communication between the battery modules is typically performed via a data bus to which the battery modules are connected. The controller is typically also connected to the same data bus.

A further aspect of the disclosure relates to a battery which comprises at least one battery module string having the above-described properties. In this case, the battery modules are configured to compare their respective operating states and to determine a ranking with which the battery modules are involved in providing a desired output voltage of the battery module string on the basis of the comparison, so that the method according to the disclosure can be executed in the battery. The controller which is also required for fully executing the method may be part of the battery, even though this is not essential. The battery is preferably a lithium-ion battery.

At least one battery module can be configured selectively to connect the first connection and the second connection of the battery module or to switch the at least one battery cell between the first connection and the second connection as a function of actuation of the coupling unit. Two different switching states are defined as a result. At least one battery module can also be configured to switch the at least one battery cell between the first connection and the second connection, wherein a polarity of the voltage which is applied between the first connection and the second connection can be selected as a function of actuation of the coupling unit. This likewise produces two switching states or else three switching states when the two said configurations are combined with one another.

The battery can also comprise a data bus to which the battery modules are connected. In this case, the battery modules are configured to compare their respective operating states by means of communication via the data bus.

The disclosure also specifies a motor vehicle having an electric drive motor for driving the motor vehicle and having a battery according to the disclosure which is connected to the electric drive motor.

BRIEF DESCRIPTION OF THE DRAWINGS

Exemplary embodiments of the disclosure will be explained in greater detail with reference to the drawings and the following description, wherein identical reference signs designate identical or functionally identical components. In the drawings.

DETAILED DESCRIPTION

Figure 1:
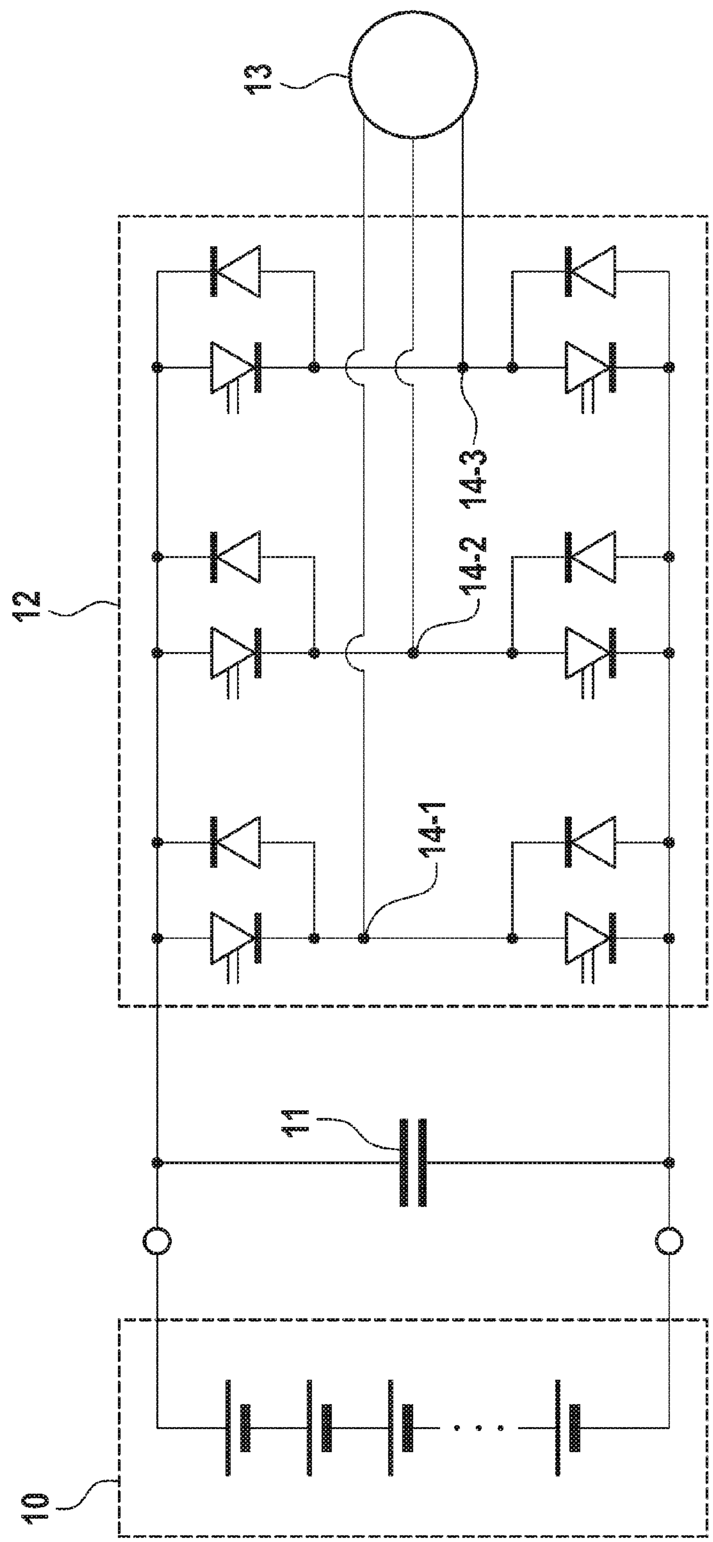
FIG. 1 shows an electrical drive unit according to the prior art.
Figure 2:
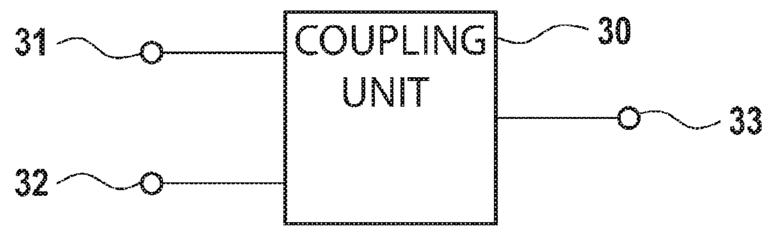
FIG. 2 shows a coupling unit which can be used in the method according to the disclosure.

FIG. 2 shows a coupling unit 30 which can be used in the method according to the disclosure. The coupling unit 3 has two inputs 31 and 32 and one output 33 and is configured to connect one of the inputs 31 or 32 to the output 33 and to decouple the other. In certain embodiments of the coupling unit, it can also be configured to disconnect both inputs 31, 32 from the output 33. However, provision is not made to connect both the input 31 and the input 32 to the output 33.

Figure 3:
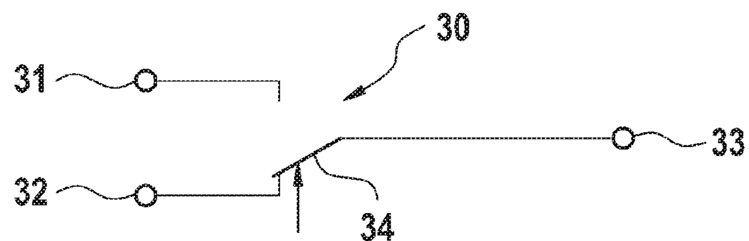
FIG. 3 shows a first embodiment of the coupling unit.

FIG. 3 shows a first embodiment of the coupling unit 30 which has a changeover switch 34 which can connect, in principle, only one of the two inputs 31, 32 to the output 33, whereas the respectively other input 31, 32 is decoupled from the output 33. The changeover switch 34 can be realized in a particularly simple manner as an electromechanical switch.

Figure 4:
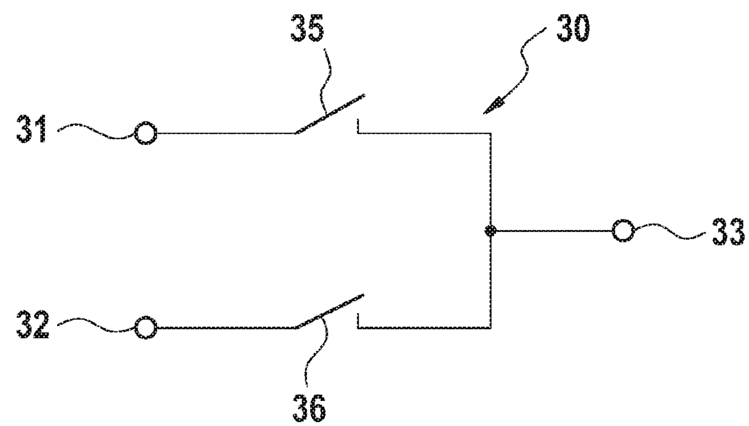
FIG. 4 shows a second embodiment of the coupling unit.

FIG. 4 shows a second embodiment of the coupling unit 30, in which a first and a second switch 35 and 36 are provided. Each of the switches is connected between one of the inputs 31 or 32 and the output 33. In contrast to the embodiment of FIG. 3, this embodiment provides the advantage that both inputs 31, 32 can also be decoupled from the output 33, so that the output 33 has a high impedance. In addition, the switches 35, 36 can be implemented in a simple manner as semiconductor switches, for example metal-oxide semiconductor field-effect transistor (MOSFET) switches or insulated gate bipolar transistor (IGBT) switches. Semiconductor switches have the advantage of a favorable price and a high switching speed, and therefore the coupling unit 30 can react to a control signal or a change in the control signal within a short time and high changeover rates can be achieved.

Figure 5:
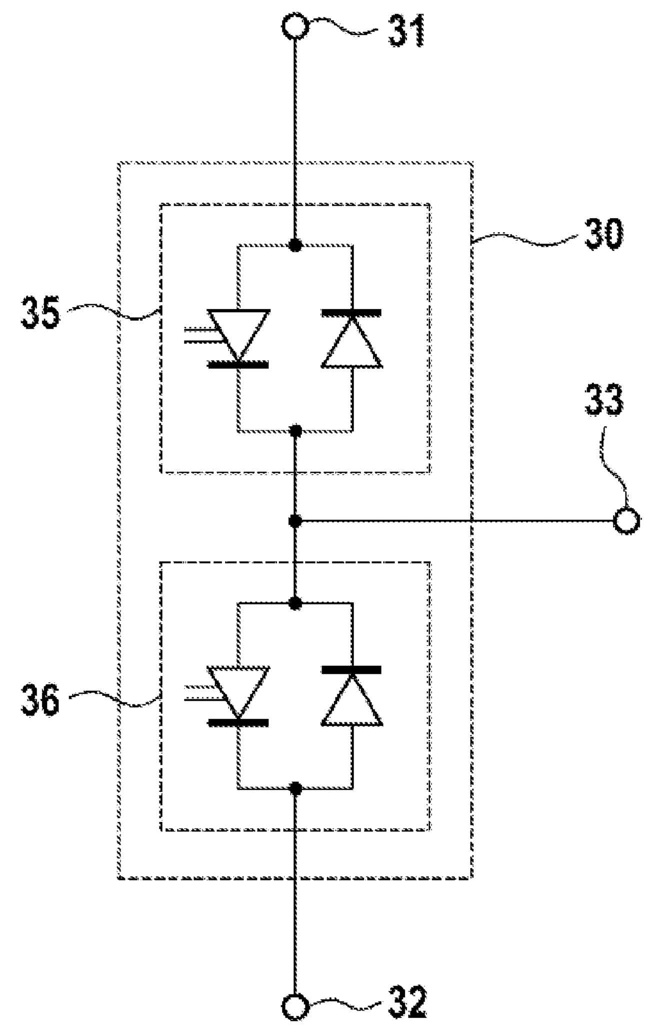
FIG. 5 shows the second embodiment of the coupling unit in a simple semiconductor circuit.

FIG. 5 shows the second embodiment of the coupling unit in a simple semiconductor circuit in which each of the switches 35, 36 in each case comprises a semiconductor valve which can be switched on and switched off, and a diode which is connected back-to-back in parallel with said semiconductor valve.

Figure 6:
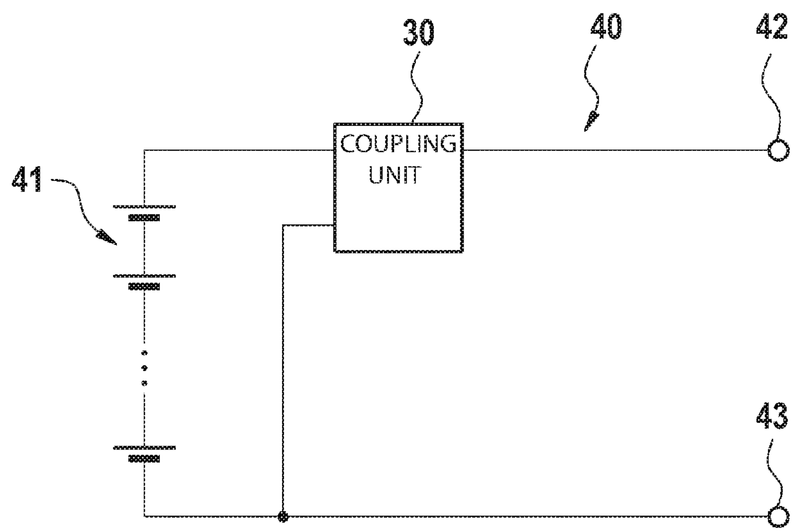
FIGS. 6 and 7 show two arrangements of the coupling unit in a battery module.
Figure 7:
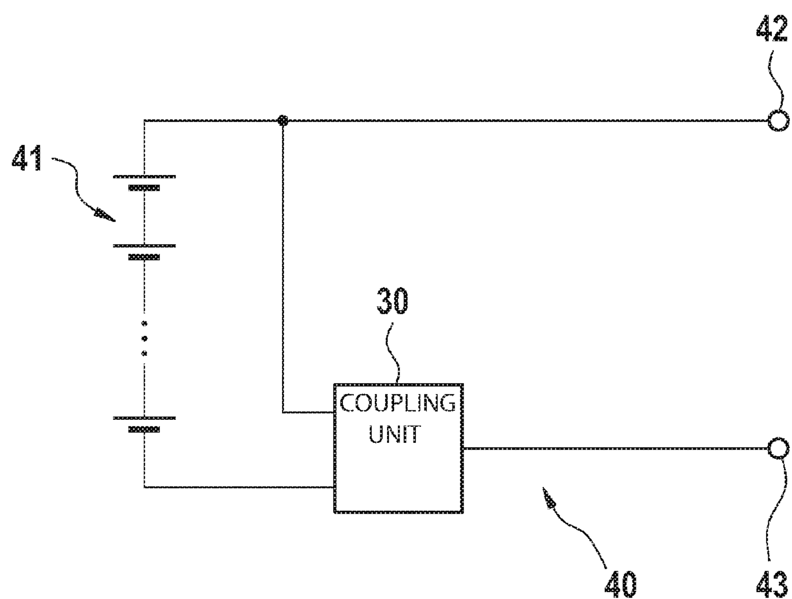

FIGS. 6 and 7 show two arrangements of the coupling unit 30 in a battery module 40. A plurality of battery cells 41 is connected in series between the inputs of a coupling unit 30. However, the disclosure is not restricted to a series circuit of battery cells of this kind; only an individual battery cell can also be provided, or else a parallel circuit or a mixed series/parallel circuit of battery cells can be provided. In the example of FIG. 6, the output of the coupling unit 30 is connected to a first connection 42 and the negative pole of the battery cells 41 is connected to a second connection 43. However, a mirror-image arrangement as in FIG. 7 is possible, in which the positive pole of the battery cells 41 is connected to the first connection 42 and the output of the coupling unit 30 is connected to the second connection 43.

Figure 8:
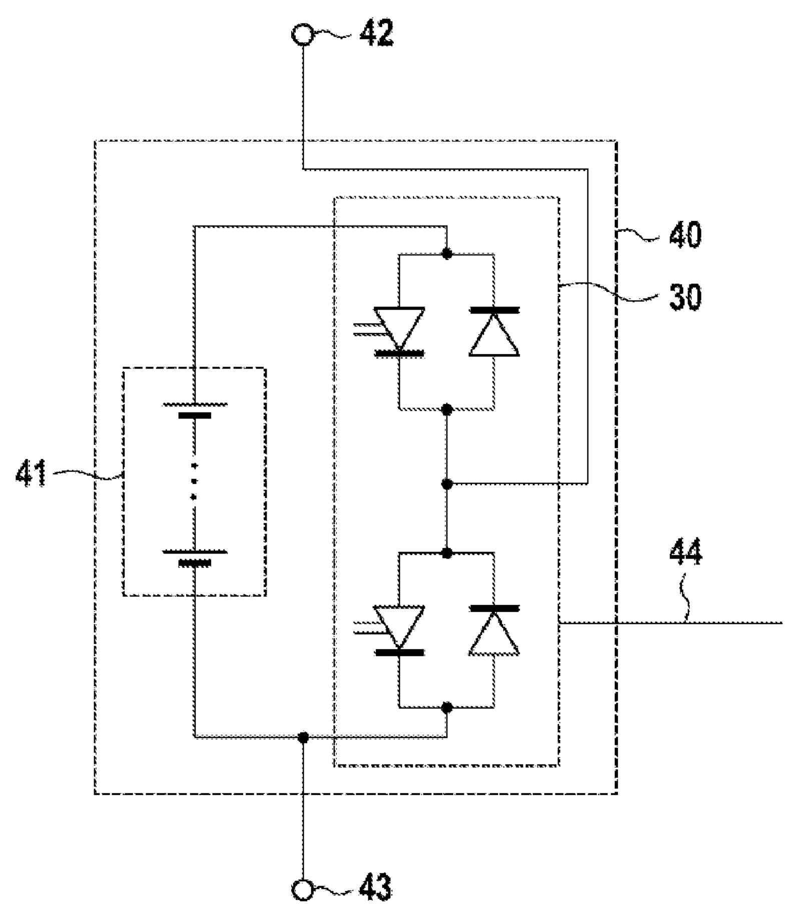
FIG. 8 shows the coupling unit illustrated in FIG. 5 in the arrangement illustrated in FIG. 6.

FIG. 8 shows the coupling unit 30, which is illustrated in FIG. 5, in the arrangement illustrated in FIG. 6. The coupling units 30 are actuated and diagnosed via a signal line 44 which is connected to a controller (not illustrated). Overall, it is possible to set either 0 volt or a voltage $U_{mod}$ between the connections 42 and 43 of the battery module 40.

Figure 9:
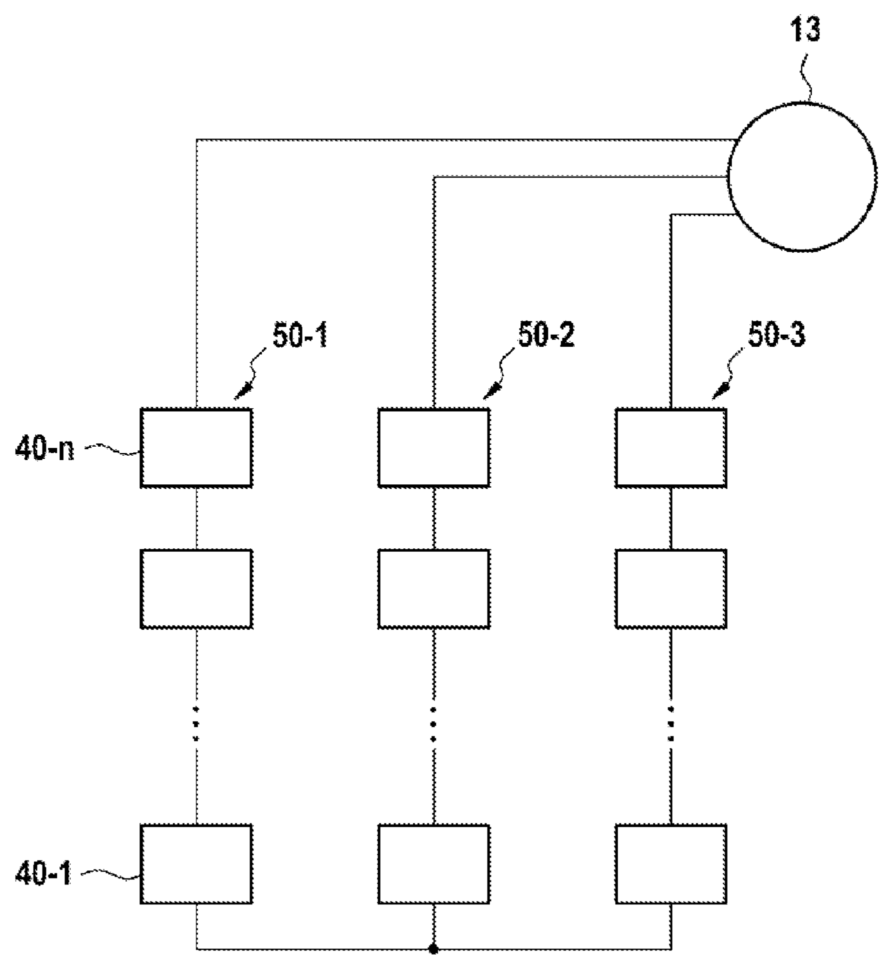
FIG. 9 shows an electrical drive unit having three battery module strings.

FIG. 9 shows an electrical drive unit having an electric motor 13, the three phases of said electric motor being connected to three battery module strings 50-1, 50-2, 50-3. Each of the three battery module strings 50-1, 50-2, 50-3 comprises a plurality of battery modules 40-1, . . . , 40-*n* which are connected in series and which each comprise a coupling unit 30 and are configured as illustrated in FIG. 6 or 7. When battery modules 40-1, . . . , 40-n are combined to form one of the battery module strings 50-1, 50-2, 50-3, in each case the first connection 42 of a battery module 40-1, . . . , 40-n is connected to the second connection 43 of an adjacent battery module 40-1, . . . , 40-n. A stepped output voltage can be generated in each of the three battery module strings 50-1, 50-2, 50-3 in this way.

Figure 10:
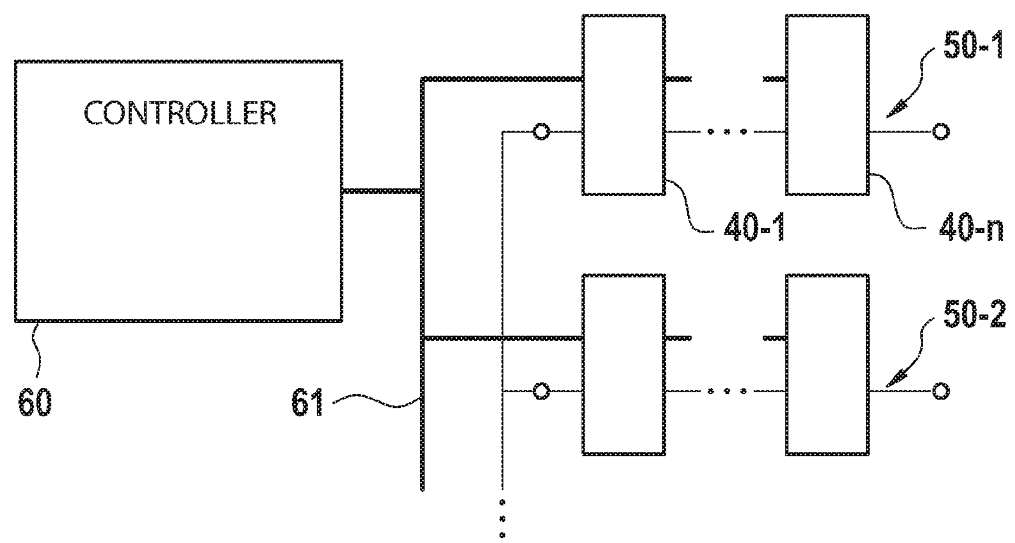
FIG. 10 shows actuation of the electrical drive unit shown in FIG. 9 by a controller.

A controller 60 which is shown in FIG. 10 is configured to output a first control signal to a variable number of battery modules 40-1, . . . , 40-n in m battery module strings 50-1, 50-2, . . . , 50-m via a data bus 61, said first control signal being used by the coupling units 30 of the battery modules 40-1, . . . , 40-n which are actuated in this way to switch the battery cell (or the battery cells) 41 between the first connection 42 and the second connection 43 of the respective battery module 40-1, . . . , 40-n. At the same time, the controller 60 outputs a second control signal to the remaining battery modules 40-1, . . . , 40-n, said second control signal being used by the coupling units 30 of these remaining battery modules 40-1, . . . , 40-n to connect the first connection 42 and the second connection 43 of the respective battery module 40-1, . . . , 40-n, as a result of which the battery cells 41 of said battery module are bridged.

Therefore, by suitable actuation of the plurality of battery modules 40-1, . . . , 40-n in m battery module strings 50-1, 50-2, . . . 50-m, m sinusoidal output voltages can be generated, these actuating the electric motor 13 in the desired manner without using an additional pulse-controlled inverter.

In a further embodiment, provision is made for the battery modules 40-1, . . . , 40-n which are used in one of the m battery module strings 50-1, 50-2, . . . , 50-m to be configured to switch the battery cells 41 thereof between the first connection 42 and the second connection 43 in such a way that a polarity of the voltage which is applied between the first connection 42 and the second connection 43 can be selected as a function of actuation of the coupling unit.

Figure 11:
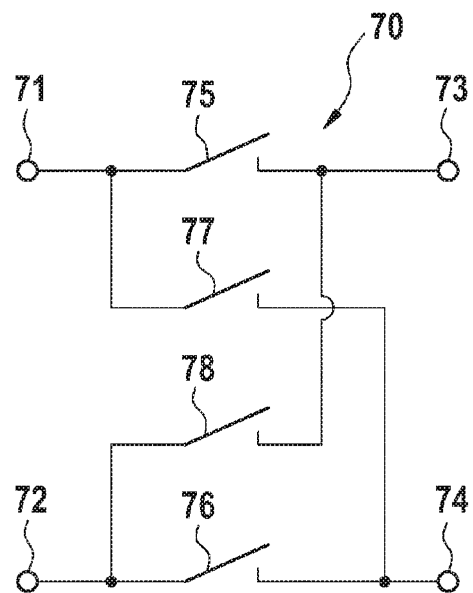
FIG. 11 shows an embodiment of the coupling unit which allows a voltage with a selectable polarity to be applied between the connections of a battery module.

FIG. 11 shows an embodiment of the coupling unit 70 which allows this and in which a first, a second, a third and a fourth switch 75, 76, 77 and 78 are provided. The first switch 75 is connected between a first input 71 and a first output 73, the second switch 76 is connected between a second input 72 and a second output 74, the third switch 77 is connected between the first input 71 and the second output 74, and the fourth switch 78 is connected between the second input 72 and the first output 73.

Figure 12:
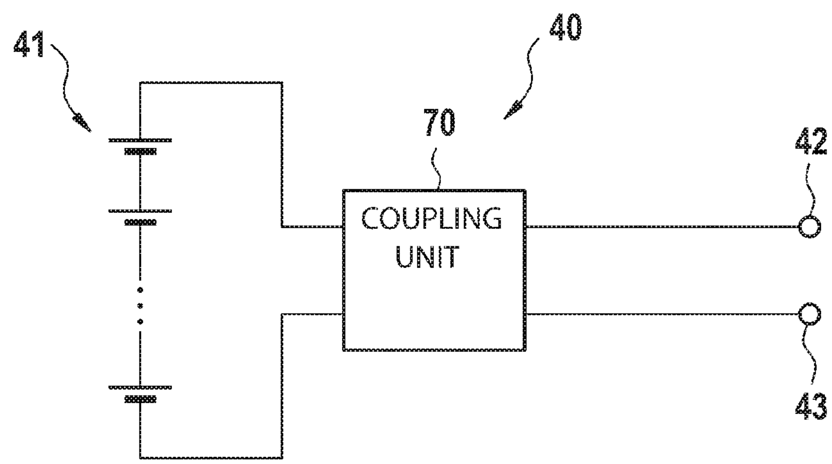
FIG. 12 shows an embodiment of the battery module with the coupling unit illustrated in FIG. 11.

FIG. 12 shows an embodiment of the battery module 40 with the coupling unit illustrated in FIG. 11. The first output of the coupling unit 70 is connected to the first connection 42, and the second output of the coupling unit 70 is connected to the second connection 43 of the battery module 40. The battery module 40 configured in this way has the advantage that the battery cells 41 can be connected to the connections 42, 43 by the coupling unit 70 with a selectable polarity, with the result that it is possible to generate an output voltage with a different mathematical sign. It may also be possible, for example by closing the switches 76 and 78 and at the same time opening the switches 75 and 77 (or else by opening the switches 76 and 78 and closing the switches 75 and 77), to connect the connections 42 and 43 to one another in a conductive manner and to generate an output voltage of 0 V. Overall, it is therefore possible to set either 0 volt, the voltage Umod or the voltage −Umod between the connections 42 and 43 of the battery module 40.

The electrical drive unit shown in FIG. 10 is illustrated with m battery module strings in general. In the text which follows, it is assumed that m=3 battery module strings since this is the most frequently occurring case in the art. The electrical drive unit with three battery module strings 50-1, 50-2, 50-3 shown in FIGS. 9 and 10 has the following property: in order to provide a required output voltage, which is smaller than the maximum available output voltage, in one of the battery module strings 50-1, 50-2, 50-3, a plurality of different switching combinations, which are, however, equivalent in respect of the behavior at the terminals to the outside, of the semiconductor switches which are involved in the systems are possible. In this case, the same current no longer flows through all the battery modules 40 contained in the system. On account of these different, equivalent switching combinations, various options for optimizing various states of the battery are produced in the control method, said options being presented in the text which follows and the intention being for said options to make a contribution to the understanding of the disclosure.

In a first exemplary embodiment of the control method, which is described for understanding the disclosure, it is assumed that the battery modules 40-1, . . . , 40-n are configured such that they can output the voltage 0 V and $+U_{mod}$. The output voltage at a battery module string 50-1, 50-2, 50-3 can then be set in steps of the module voltage $U_{mod}$. The maximum output voltage at a battery module string 50-1, 50-2, 50-3 is a multiple of the individual module voltage $U_{mod}$. Therefore, given four battery modules 40-1, . . . , 40-4 per battery module string, the battery string voltage $U_{Str}$ can vary in steps between values of 0 V and $4\times U_{mod}$. In this case, a step of the output voltage with the following number of different, equivalent or redundant switching states can be realized:

$U_{Str}=0$: 1 (all coupling modules off).

$U_{Str}=U_{mod}$: 4 (one coupling module on, 3 coupling modules off).

$U_{Str}=2\ U_{mod}$: 6 (2 coupling modules on, 2 coupling modules off).

$U_{Str}=3\ U_{mod}$: 4 (3 coupling modules on, 1 coupling module off). $U_{Str}=4\ U_{mod}$: 1 (all coupling modules on).

In other words, four possible switching states are available for providing the output voltage of a battery string $U_{Str}=U_{mod}$: in each case, only one of the four battery modules 40-1, . . . , 40-4 is switched by means of the coupling unit 30 such that it outputs the output voltage $U_{mod}$, whereas the respectively three other battery modules are connected by means of their coupling units 30 such that they conduct the voltage 0 V to the outside.

Therefore, apart from at the output voltages 0 V and 4 $U_{mod}$, a plurality of equivalent switching states are in each case available in order to allow the current $I_{str}$, which flows out of the battery module string or into said battery module string, to flow through specific battery modules 40-1, . . . , 40-4.

The potential difference between the connections of the electrical drive unit which is illustrated in FIGS. 9 and 10 and which functions as an inverter is produced from the output voltages of the individual battery module strings 50-1, 50-2, 50-3. In this case, identical potential differences can also be redundantly achieved by different output voltages at the battery module strings 50-1, 50-2, 50-3. When the switching state of the entire inverter is described by a group of three numbers, wherein the first number describes the switching state of the first battery module string 50-1, the second number describes that of the second battery module string 50-2, and the third number describes that of the third battery module string 50-3 and the numbers indicate that the multiple of the module voltage $U_{mod}$ is applied to the terminals of the respective battery module string 50-1, 50-2, 50-3, the following states are identical in terms of the potential difference: 100, 211, 322 and 433. The current flow in this branch can again be distributed to specific modules by means of the selection of one of the equivalent switching states of the inverter.

A selection prespecification, according to which the individual battery modules are involved in carrying current, is produced depending on which of the states of the battery modules 40 are intended to be influenced. Influencing of the state of charge will be described first in the text which follows. The selection of the battery modules 40 depends on the direction of the current flow in the battery module string 50-1, 50-2, 50-3 and on the state of charge SOC. The state of charge SOC of a module 50 can be derived either directly from its voltage or known methods for determining the SOC can be used. In this case, the current direction is known from the regulation of the inverter. If the current direction is such that the current in the battery module string $I_{Str}>0$ (that is to say when the modules 40 are discharged), the modules 40 involved in carrying current are those which currently have the highest state of charge. If the current direction is such that the current in the battery module string $I_{Str}<0$, the modules 40 involved in carrying current are those which currently have the lowest state of charge.

By way of example, the battery modules 40 are selected sequentially. In this case, the battery module 40 with the lowest state of charge SOC is first selected, and then the battery module 40 with the second lowest state of charge SOC etc. However, state of charge ranges can also be predetermined and specific selection probabilities can be allocated to said state of charge ranges. In particular, a higher probability for selection can be allocated to a high state of charge range than to a low state of charge range, and vice versa, depending on the desired current direction. In this case, the batteries with a high state of charge are more frequently involved in carrying current than those with a low state of charge, and a series of the battery modules does not have to be determined in respect of the state of charge. In each case, this control prevents the state of charge of the various battery modules 40 differing greatly.

The temperature of the battery modules 40, and therefore of the entire battery, can also be influenced. The temperature of the battery cells is measured for safety reasons and is therefore known. The current direction does not affect the temperature development. The modules 40 which are most frequently involved in carrying current are preferably those which have the lowest temperature. The modules which are most rarely involved in carrying current are those which have the highest temperature.

In order to be able to influence the aging, it is possible, when a state of health (SOH) for the battery modules 40 is determined from known methods, for the modules 40 to be involved in carrying current as a function of said state of health. The modules 40 with the highest SOH are preferably most frequently involved in carrying current. The modules 40 with the lowest SOH are most rarely involved in carrying current. If no SOH is known for the modules 40, the distribution of the current carrying periods can be distributed uniformly between the modules, so that uniform aging takes place.

The service life of the battery modules can also be influenced by the method. In this case, the service life of battery cells is determined by the charging and discharging cycles. In order to obtain as few cycles as possible for a module, switching states in which the desired state is achieved with a minimum number of modules involved in carrying current are always selected.

The states of the battery modules can each be individually influenced. However, it is also possible for a plurality of or all states to be influenced at the same time. In this case, the rules for the respective battery characteristic variables are evaluated jointly. If the various rules produce contradictory requirements for selecting the modules 40, this can be resolved by means of prioritizing the individual characteristic variables. Another option for resolving the conflict is to provide a certain period of time for each state, the modules 40 being selected in accordance with the associated rule in said period of time and then the individual characteristic variables being influenced in an iterative manner.

In a second exemplary embodiment of the control method which is described for understanding the disclosure, battery modules 40-1, . . . , 40-4 of FIG. 12 are now used, said battery modules therefore being able to output three voltage values: $+U_{mod}$, 0 V and $-U_{mod}$. Therefore, the output voltage at the battery module strings 50-1, 50-2, 50-3 can be set in steps of the module voltage $U_{mod}$ from $U_{Str}$, $=-4\times U_{mod}$ to $4\times U_{mod}$. In this case, one step of the output voltage can be realized with the following number of different switching states:

| | |
|---|---|
| $U_{Str}$, $= -4\ U_{mod} \rightarrow$ | 1 (all battery modules output $-U_{mod}$) |
| $U_{Str}$, $= -3\ U_{mod} \rightarrow$ | 4 (three modules $-U_{mod}$, one module 0 V) |
| $U_{Str}$, $= -2\ U_{mod} \rightarrow$ | 10 |
| $U_{Str}$, $= -U_{mod} \rightarrow$ | 16 |
| $U_{Str}$, $= 0\ V \rightarrow$ | 19 |
| $U_{Str}$, $= U_{mod} \rightarrow$ | 16 |
| $U_{Str}$, $= 2\ U_{mod} \rightarrow$ | 10 |
| $U_{Str}$, $= 3\ U_{mod} \rightarrow$ | 4 (three modules $+U_{mod}$, one module 0 V) |
| $U_{Str}$, $= 4\ U_{mod} \rightarrow$ | 1 (all battery modules output $+U_{mod}$) |

This results, for example, in 10 possible combinations for the required battery string output voltage of $2\times U_{mod}$ with the individual module voltages of $+U_{mod}$ (+), $-U_{mod}$ (−) and 0 V (0):

| Module | 1 | 2 | 3 | 4 | 5 | 6 | 7 | 8 | 9 | 10 |
|---|---|---|---|---|---|---|---|---|---|---|
| 1 | + | + | 0 | + | 0 | 0 | + | + | + | − |
| 2 | + | 0 | + | 0 | + | 0 | + | + | − | + |
| 3 | 0 | + | + | 0 | 0 | + | + | − | + | + |
| 4 | 0 | 0 | 0 | + | + | + | − | + | + | + |

Therefore, apart from at the output voltages $-4\ U_{mod}$ and $4\ U_{mod}$, a plurality of equivalent, redundant switching states are in each case available in order to allow the current I, which flows out of the battery module string 50-1, 50-2, 50-3 or into said battery module string, to flow through specific modules 40-1, . . . , 40-4.

The potential difference between the connections of the inverter can also be achieved by different output voltages at the battery module strings 50-1, 50-2, 50-3 here. When the switching state of the entire inverter is described by a group of three numbers, wherein the first number describes the switching state of the first battery module string 50-1, the second number describes that of the second battery module string 50-2, and the third number describes that of the third battery module string 50-3 and the numbers indicate that the multiple of the module voltage $U_{mod}$ is applied to the terminals of the respective battery module string 50-1, 50-2, 50-3, the following states are identical in terms of the potential difference: 344 and 233 and 122 and 011 and also −100 and −2−1−1 and −3−2−2 and −4−3−3. The current flow in this branch can once again be distributed to specific modules by means of the selection of one of the equivalent switching states of the inverter.

The same rules as described in the first exemplary embodiment apply for influencing the states of the battery. Only the rule for influencing the state of charge is modified.

The selection of the modules 40 depends on the direction of the current flow in the battery module string 50-1, 50-2, 50-3, on the state of charge SOC and the module output voltage $-U_{mod}$ and $+U_{mod}$. The current direction and the required module output voltage are known for regulating the inverter. If:

$I_{Str}>0$ and $U_{Str}>0$, the modules 40 involved in carrying current are those which currently have the highest state of charge, that is to say with a falling state of charge;

$I_{Str}<0$ and $U_{Str}>0$, the modules 40 involved in carrying current are those which currently have the lowest state of charge, that is to say with a rising state of charge;

$I_{Str}<0$ and $U_{Str}<0$, the modules 40 involved in carrying current are those which currently have the highest state of charge, that is to say with a falling state of charge;

$I_{Str}>0$ and $U_{Str}<0$, the modules 40 involved in carrying current are those which currently have the lowest state of charge, that is to say with a rising state of charge.

In this case, it is merely preferred, but not restricted, to begin with the respectively lowest or highest state of charge. As stated in the first exemplary embodiment, state of charge ranges can also be defined and these ranges can be allocated a certain selection probability. In this case, it is not necessary to determine the ranking of the battery modules 40 in accordance with state of charge each time.

All other battery characteristic variables can be selected as in the first exemplary embodiment.

In summary, battery modules 40 which are required for providing a specific output voltage in one of the battery module strings 50-1, 50-2, 50-3 are selected on account of various criteria in the two above-described exemplary embodiments of the control method which have been described for understanding the disclosure. In this case, the controller 60, which determines the desired output voltage, typically also has to determine the states of the battery modules 40 and make a suitable selection from amongst the battery modules 40. Firstly, the additional computational power in the controller 60 is required for this purpose. Secondly, it is necessary to transmit a very large amount of data from the battery modules 40 to the controller 60, it being possible for the controller 60 to determine the respective current state of each battery module 40 on the basis of said data. Provision can now be made, according to the disclosure, for a ranking to be determined amongst the battery modules 40, with which ranking said battery modules are intended to be involved in providing a desired output voltage of one of the battery module strings 50-1, 50-2, 50-3 by the battery modules 40 being compared to one another in accordance with the above-described criteria in respect of their respective operating states and determining the ranking on the basis of this comparison. Therefore, the battery modules 40 determine which of the battery modules 40 is intended to be involved in forming the output voltage. In a further method step, the output voltage which is to be provided is determined by a controller 60. In response to this, the controller 60 sends a message to all battery modules 40. The message can contain either the desired output voltage or a number of battery modules M which have to assume a predetermined switching state. On the basis of a comparison between the message which is sent by the controller 60 and the specific ranking, a switching state, which is to be assumed, is defined in each of the battery modules and is finally assumed by each of the battery modules 40, in order to provide the required output voltage.

Within the scope of the method according to the disclosure, it is no longer necessary to transmit all data, which is required for determining the operating state of one of the battery modules 40, to the controller 60, and the controller 60 no longer needs to expend any computational power in order to determine the module states. Therefore, the information processing power is redistributed from the controller 60 to the individual modules 40. Each of the battery modules 40 automatically determines the state which it is currently in and, with other battery modules 40 in one of the battery module strings 50-1, 50-2, 50-3, negotiates its position in the ranking in respect of its operating state.

To be precise, during the course of determining the ranking of the battery modules 40 within one of the battery module strings 50-1, 50-2, 50-3, a number z1 which runs from 1 to n is allocated to each of the battery modules 40-1, . . . , **40-*n*. That battery module 40 which is most preferably to be involved in providing the output voltage is given the number z1=1, whereas the battery module which is preferably intended to be least involved is given the number z1=n. This allocation is used for the normal case in which the battery modules 40** are discharged. The criteria cited above are applied when determining the ranking or the order defined by the number z1.

At the same time, a second number, which is defined by the expression $z2=(2*n)+1-z1$, is allocated to each of the battery modules 40-1, . . . , **40-*n*. This allocation is used in the case in which the battery modules 40** are charged.

Communication between the controller 60 and all battery modules 40 on the one hand and between the battery modules 40-1, **40-*n* within one of the battery module strings 50-1, 50-2, 50-3 on the other hand takes place, as illustrated in FIG. 10, via a data bus 61 which may be, for example, a controller area network (CAN) bus or a FlexRay bus or another suitable bus. In this case, the controller 60 itself can be a constituent part of the battery 10, or be arranged outside the battery 10**.

The controller 60 determines the output voltage, which is to be provided, in one of the battery module strings 50-1, 50-2, 50-3 on the basis of the connected load, for example a three-phase motor, and the existing current direction.

If the current direction in one of the battery module strings 50-1, 50-2, 50-3 is such that the battery modules 40 are discharged, the number M which is ascertained by the controller 60 is a natural number between 1 and n. If the battery modules are charged, the relationship M=n+number of modules which are to be switched on results. In this case, M is a natural number between n+1 and 2n.

The controller 60 then sends a message to all battery modules 40-1, **40-*n* in one of the battery module strings 50-1, 50-2, 50-3 via the data bus 61, wherein the sent message contains the number M which was ascertained by the controller 60**.

Figure 13:
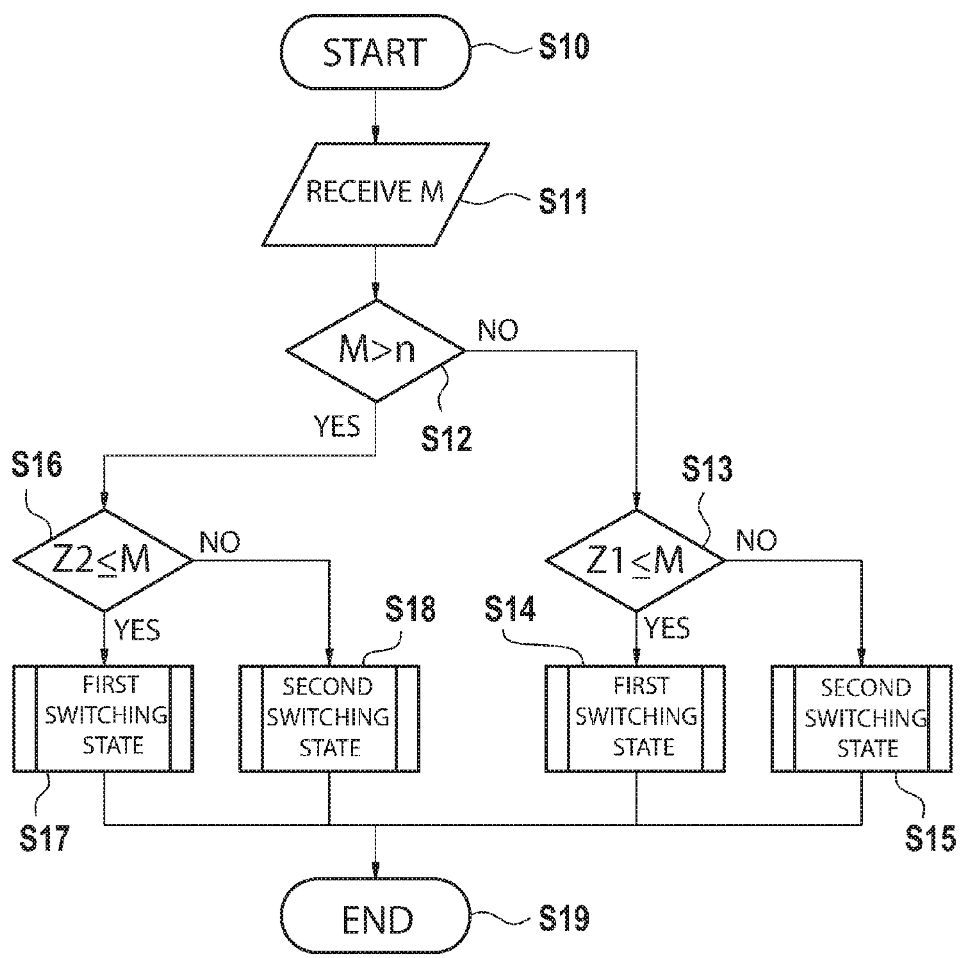
FIG. 13 shows the selection of the switching states assumed in the battery modules using a flowchart.

FIG. 13 shows the selection of the switching states assumed in the battery modules 40-1, . . . , **40-*n* in a flowchart. In this case, a selection is made between a first switching state ($U_{mod}$) and a second switching state (0 V) (for example in the battery modules illustrated in FIGS. 6 to 8**).

The selection method starts in method step S10. The message which contains the number M is received in a battery module 40 in question in method step S11, and the battery module in question checks whether M is greater than n in method step S12. If this is not the case (this corresponds to the case in which the battery modules 40 are discharged), a check is made in method step S13 to determine whether the number z1 which is allocated to the respective battery module is less than or equal to the number M. If the latter is true, the battery module 40 in question assumes the first switching state, and therefore supplies $U_{mod}$, in method step S14. In the other case, said battery module assumes the second switching state, and therefore supplies 0 V, in method step S15.

If, in contrast, the number M is greater than the number n, a check is made in method step S16 to determine whether the number z2 is less than or equal to the number M. If this is the case, the battery module in question assumes the first switching state in method step S17. In the other case, said battery module assumes the second switching state in method step S18.

The method for selecting the switching state in the battery modules 40-1, . . . , 40-*n* ends in method step S19.

The described selection can be extended in a simple manner to the case in which the battery modules 40 can be switched between three switching states, that is to say, for example, in the configuration illustrated in FIG. 12. A selection is made between the first switching state ($U_{mod}$) and the second switching state (0 V) in exactly the same way as illustrated in FIG. 13.

In contrast, it is possible for a negative output voltage to be provided in one of the battery module strings 50-1, 50-2, 50-3 by virtue of the controller 60 outputting a negative number M. In this case, completely in analogy to the algorithm illustrated in FIG. 13, a selection is made between the second switching state (0 V) and a third switching state ($-U_{mod}$) by each of the battery modules 40-1, . . . , 40-*n* in question by the negative number M being compared with the numbers −n, −z1 and −z2.

The invention claimed is:

1. A method for controlling a battery having at least one battery module string having a plurality of battery modules which are connected in series, each battery module including at least one battery cell, at least one coupling unit, a first connection and a second connection and being configured to assume one of at least two switching states as a function of actuation of the at least one coupling unit, various switching states corresponding to different voltage values between the first connection and the second connection of the battery module, the method comprising:

i. determining a ranking of the battery modules with which said battery modules are involved in providing a desired output voltage of the battery module string, wherein the battery modules compare their respective operating states and determine the ranking on the basis of the comparison;

ii. determining, with a controller, an output voltage, which is to be provided, of the battery module string;

iii. sending, with the controller, a message to at least one of the battery modules;

iv. establishing a switching state, which is to be assumed, in each of the battery modules on the basis of a comparison between the message sent by the controller and the determined ranking; and v. assuming, by each of the battery modules, the established switching state.

2. The method as claimed in claim 1, wherein the battery modules are configured to compare their respective operating states in respect of at least one of:

a state of charge, a temperature, aging, and a service life.

3. The method as claimed in claim 1, wherein sending the message includes sending the message to each of the battery modules.

4. The method as claimed in claim 1, wherein the message sent by the controller contains the output voltage, which is to be provided, of the battery module string.

5. The method as claimed in claim 1, wherein the message sent by the controller contains a number of battery modules which are to assume a predetermined switching state.

6. The method as claimed in claim 1, wherein each of the battery modules is configured to automatically determine its respective operating state.

7. The method as claimed in claim 1, wherein the battery modules are configured to compare their respective operating states by communication via a data bus to which the battery modules are connected.

8. A battery comprising:

at least one battery module string having a plurality of battery modules which are connected in series, each battery module including at least one battery cell, at least one coupling unit, a first connection and a second connection and each battery module configured to assume one of at least two switching states as a function of actuation of the at least one coupling unit, various switching states corresponding to different voltage values between the first connection and the second connection of the battery module; and a controller configured to determine an output voltage, which is to be provided, of the battery module string and configured to send a message to at least one of the battery modules, wherein the battery modules are configured to compare their respective operating states and to determine a ranking with which the battery modules are involved in providing a desired output voltage of the battery module string on the basis of the comparison, wherein a switching state, which is to be assumed, in each of the battery modules is established based on a comparison between the message sent by the controller and the determined ranking, and wherein each of the battery modules is configured to assume the established switching state.

9. The battery as claimed in claim 8, wherein at least one battery module is configured selectively to achieve at least one of connecting the first connection and the second connection of the battery module and switching the at least one battery cell between the first connection and the second connection as a function of actuation of the at least one coupling unit.

10. The battery as claimed in claim 8, wherein:

at least one battery module is configured to switch the at least one battery cell between the first connection and the second connection, and a polarity of a voltage which is applied between the first connection and the second connection is selected as a function of actuation of the at least one coupling unit.

11. The battery as claimed in claim 8, further comprising:

a data bus to which the battery modules are connected, wherein the battery modules are configured to compare their respective operating states by communication via the data bus.

12. A motor vehicle, comprising:

an electric drive motor configured to drive the motor vehicle; and a battery which is connected to the electric drive motor, the battery including:

at least one battery module string having a plurality of battery modules which are connected in series, each battery module including at least one battery cell, at least one coupling unit, a first connection and a second connection and each battery module configured to assume one of at least two switching states as a function of actuation of the at least one coupling unit, various switching states corresponding to different voltage values between the first connection and the second connection of the battery module; and a controller configured to determine an output voltage, which is to be provided, of the battery module string and configured to send a message to at least one of the battery modules, wherein the battery modules are configured to compare their respective operating states and to determine a ranking with which the battery modules are involved in providing a desired output voltage of the battery module string on the basis of the comparison, wherein a switching state, which is to be assumed, in each of the battery modules is established based on a comparison between the message sent by the controller and the determined ranking, and wherein each of the battery modules is configured to assume the established switching state.

* * * * *